United States Patent Office 2,830,851
Patented Apr. 15, 1958

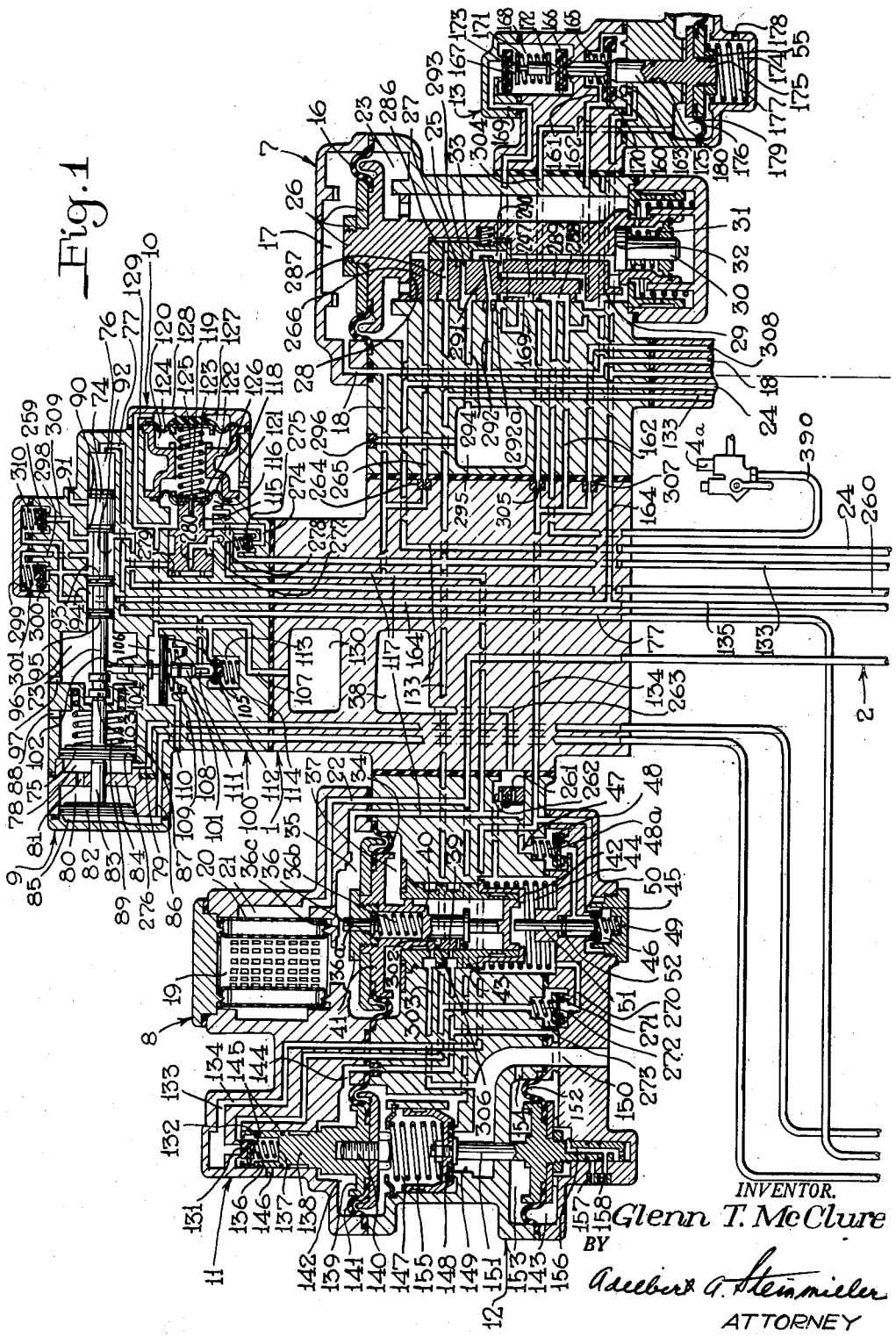

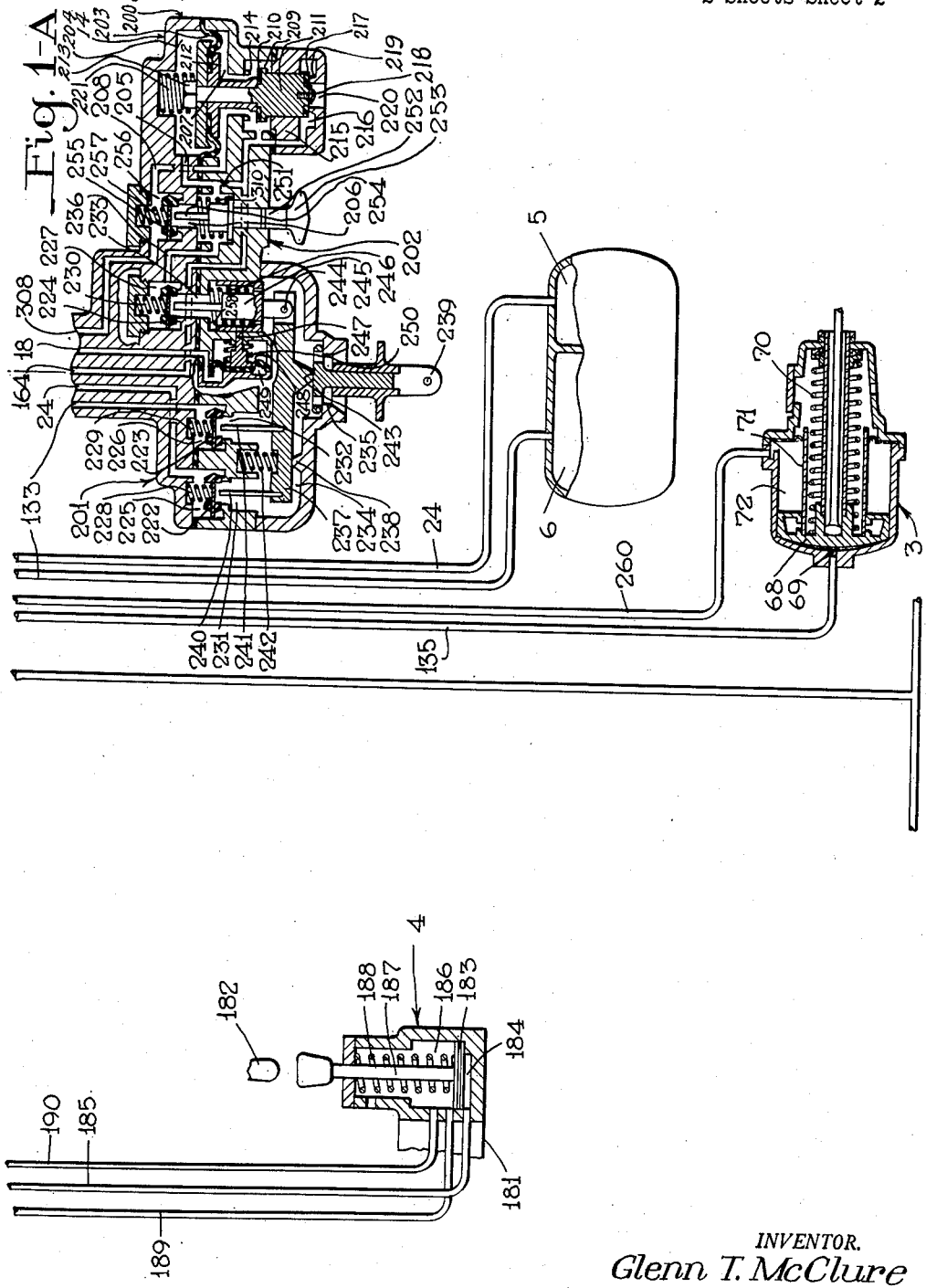

2,830,851

FLUID PRESSURE BRAKE APPARATUS

Glenn T. McClure, McKeesport, Pa., assignor to Westinghouse Air Brake Company, Wilmerding, Pa., a corporation of Pennsylvania Application May 28, 1953, Serial No. 357,984

9 Claims. (Cl. 303—38)

This invention relates to fluid pressure brakes and more particularly to the type for use on railway cars.

One object of the invention is the provision of an improved, relatively simple, low cost and highly reliable brake controlling valve device for this use which may embody means to provide for braking of a car in accordance with the weight of load carried by the car.

Another object of the invention is to provide a fluid pressure brake equipment having the parts so grouped and interrelated as to avoid interference with operation due to leakage.

Another object of the invention is to provide a fluid pressure brake equipment in which the cost of maintenance is reduced to a minimum.

Another object is to provide an improved brake release and reapplication valve device for use in conjunction with a brake equipment of the above type for releasing fluid under pressure from the brake cylinder device to release the brakes on the car with the brake pipe fully vented and without losing the fluid pressure still remaining in the storage reservoirs and for reapplying the brakes by supplying fluid under pressure thus retained in said reservoirs to the brake cylinder device.

Another object is to provide an improved brake release valve device for use in conjunction with a brake equipment of the above type which may not be operated as long as the brake pipe is charged with fluid under pressure so as to prevent malicious tampering with the brakes while the car is in a moving train.

Another object of the invention is to provide a simplified means for a combined quick service action and controlled emergency build-up of brake cylinder pressure in a single valve device operating under a single control by brake cylinder pressure.

Other objects and advantages will become apparent from the following more detailed description of the invention.

In the accompanying drawings; Figs. 1, 1A, when the right-hand side of Fig. 1 is matched to the left-hand side of Fig. 1A, is a diagrammatic view of a fluid pressure brake apparatus embodying the invention.

Description

As shown in the drawing, the improved brake apparatus comprises a brake controlling valve device 1 arranged to be controlled by variations in pressure in a brake pipe 2, a load compensating brake cylinder device 3, a strut device 4, the usual brake cylinder pressure retaining valve device 4a, auxiliary reservoir 5 and emergency reservoir 6.

The brake controlling valve device 1 comprises a service application valve device 7, an emergency application valve device 8, a load compensating valve device 9, a cut-off valve device 10, an emergency high pressure valve device 11, a brake pipe vent valve device 12, a combined quick service limiting and emergency inshot valve device 13 and a brake cylinder release and reapplication valve device 14.

The service application valve device 7 comprises a flexible diaphragm 16 clamped around its peripheral edge in the casing of the device. At one side of diaphragm 16 is a control chamber 17 open to brake pipe 2 through a passage 18, a chamber 35 to a chamber 19 within an annular air strainer 20, through said strainer, an annular chamber 21 encircling said strainer and a passage 22 leading to said brake pipe. At the opposite side of diaphragm 16 is a valve chamber 23 which is in constant communication with the auxiliary reservoir 5 by way of a passage 24. A stem 25 slidably mounted in the casing within chamber 23 is connected at one end to the diaphragm 16 centrally thereof by conventional clamping means 26 for movement with said diaphragm. A main slide valve 27 contained in chamber 23 and arranged to slide on a seat in the casing is mounted with a certain degree of lost motion between a shoulder 28 provided on stem 25 adjacent the diaphragm 16 and a shoulder 29 on said stem adjacent its opposite end. In this opposite end of stem 25 there is provided a plunger 30 normally projected by a spring 31 to a position defined by contact with a shoulder 32 on said stem and in which position said plunger is spaced slightly ahead of shoulder 29 for contact with the adjacent end of said valve. An auxiliary slide valve 33 slidably mounted on a seat provided on main slide valve 27 is disposed in a recess in the stem 25 for movement therewith.

The emergency application valve device 8 comprises a flexible diaphragm 34 clamped around its peripheral edge in the casing and at one side of which there is the chamber 35 open to brake pipe 2 through chamber 19 in the air strainer 20, chamber 21 and passage 22. At the opposite side of diaphragm 34 is a valve chamber 37 open via a passage 263 to a quick action chamber 38 and containing a slide valve 39 mounted on a seat in the casing and disposed in a recess in a stem 40 for movement therewith. The stem 40 is slidably mounted in the casing in valve chamber 37 and has one end connected to the diaphragm 34 centrally thereof by conventional securing means 41 for movement by said diaphragm. A plunger 36 is slidably and coaxially mounted in stem 40 and urged outwardly into contact with a shoulder 36a by a spring 36b into chamber 35 for contact with a boss 36c formed in the casing.

A plunger 42 slidably mounted in the casing coaxial with stem 40 is arranged for contact with the opposite end of said stem and is constantly urged toward a stop shoulder 43 in the casing by a spring 44. Disposed below the lower end of stem 40 is a poppet type back-dump valve 45 contained in a chamber 46 and arranged to control communication between said chamber and a passage 47 past a check valve 48, normally held seated by a spring 48a. The passage 47 is open to the brake pipe 2 via chamber 35, air strainer 20 and passage 22. The check valve 48 is arranged to permit flow of fluid under pressure only in the direction from chamber 46 to passage 47. A spring 49 in chamber 46 acts on valve 45 to urge it into contact with a seat 50 for closing the communication controlled thereby. For unseating the check valve 45 from seat 50 a plunger 51 is slidably mounted in a bore in the casing with one end contacting the valve 45 and its other end disposed in valve chamber 37 for engagement by the lower end of stem 40 upon movement of said stem and plunger 42 against spring 44. A resilient ring seal 52 carried by the plunger 51 slidably engages the wall of the casing bore in which said stem operates to prevent leakage of fluid under pressure between chamber 37 and passage 47.

The brake cylinder device 3 may comprise a casing containing a piston 68, at one side of which is the usual pressure chamber 69 in which fluid under pressure may act on said piston to move same outwardly for applying the brakes. Upon release of fluid under pressure from chamber 69 a return spring 70 is adapted to move piston 68 inwardly to a brake release position in which it is shown in Fig. 1A of the drawings. A cylinder 71 encircling return spring 70 and attached at one end to piston 68 and slidably mounted adjacent its opposite end in the casing takes part with said piston and casing in defining a load compensating chamber 72 around said cylinder provided for the purpose of receiving fluid under pressure to oppose the action of fluid under pressure in chamber 69 on piston 68. With a fully loaded vehicle chamber 72 will be open to atmosphere, as will be described later, in order that the brakes on the vehicle will be applied to a degree governed solely by pressure of fluid in chamber 69 acting on piston 68. With a vehicle empty a certain maximum pressure of fluid will be provided in chamber 72, whereby the degree of braking of the empty vehicle will be limited to the differential in opposing fluid forces acting on piston 68. For a partially or half-loaded vehicle, for example, a certain lower pressure of fluid will be provided in chamber 72 in order to obtain a greater differential in opposing forces acting on piston 68 as necessary to provide the greater braking force for the half-loaded vehicle than for the empty vehicle.

The load compensating valve device 9 comprises a casing having slidably mounted therein a control element or rod 73 to the outer end of which is connected an "empty" brake control piston 74 and to the inner end of which is connected a loaded brake control piston 75, which has a larger area than piston 74. At the outer face of piston 74 is a pressure chamber 76 which is constantly open to a passage 77, while at the outer face of piston 75 is a pressure chamber 78 which is constantly open to a passage 79 and open to a chamber 80 through a passage 81. Contained in chamber 80 is a half-load brake control piston 82 with the same effective area as piston 75 and having a stem 83 which extends through a suitable opening in a wall 84 between chambers 78 and 80 for contacting piston 75. At the other side of piston 82 is a pressure chamber 85 which is constantly open to a passage 86. The passages 77, 79 and 86 lead to the strut device 4 via communications hereinafter to be described. At the inner face of piston 75 is a chamber 87 which is constantly open to atmosphere through a vent port 88 and which contains a spring 89 urging the piston 75 toward its "empty" brake control position in which it is shown in Fig. 1.

The piston 74 is provided with a pair of spaced sealing rings 90 having the space between them connected to atmosphere by way of a vent port 91. At the inner side of the piston 74 is a chamber 92, which is defined in part by a piston valve 93 connected to the control rod 73 in spaced relation to the piston 74. At the other side of piston valve 93 is a chamber 94 which is defined in part by a piston valve 95 connected to the control rod 73 in spatial relation to the piston valve 93. At the other side of piston valve 95 is a locking chamber 96 which is open to atmosphere by way of a port 97.

The load compensating valve device 9 further comprises a locking mechanism 100 which comprises a plunger 101 slidably mounted in a suitable bore in the casing and having on one end a dog 102 for locking relation with annular bosses, or collars, 103, 104 connected to the brake control rod 73 in the chamber 96. A piston 105 is provided for actuating the plunger 101 into and out of said locking relation and is provided at one side with a piston chamber 106 connected to a passage 107 and at the other side with a spring chamber 108 containing a spring 109 urging said plunger toward the locking position in which it is shown in Fig. 1. The chamber 108 is connected to atmosphere through a vent port 110. On the end opposite to the dog 102 the plunger 101 is provided with a stem 111 for operatively engaging a check valve 112 contained in a chamber 113 and biased toward its seated position by a spring 114 contained therein. As will appear more fully later, this valve 112 defers the flow of fluid under pressure to the pressure chamber 76 until the dog 102 has been actuated out of locking relation with the brake control rod 73.

The cut-off valve device 10 comprises a piston valve 115 contained in a chamber 116 formed in a portion of the casing and which is in constant communication with brake pipe 2 by way of passages 117 and 18, chamber 35, chambers 19 and 21, and passage 22. The chamber 116 is closed at one end by a diaphragm 118 which is secured at its center by screw-thread means 119 to one end of piston valve 115 and which also aids in defining a chamber 120 at the other side, the latter chamber being open to atmosphere through a vent port 121. Contained in chamber 120 is a composite strut member 122 which aids in securing diaphragm 118 in place, supports a spring 123 interposed between said diaphragm and a somewhat larger diaphragm 124 likewise secured by said strut member as a closure for the other end of chamber 120. Strut member 122 also serves as a stop to be contacted by a follower 125 to limit the inward deflection of diaphragm 124 and by a follower 126 to limit inward deflection of diaphragm 118. At the other side of diaphragm 124 is a chamber 127 defined in part by a cap member 128 and constantly connected to chamber 116 by way of a passage 129.

Whenever the pressure of fluid in brake pipe 2 is less than a chosen degree, such as ten pounds, spring 123 will deflect diaphragm 118 against such pressure in chamber 116 and thereby move piston valve 115 to a cut-in position which may be defined by engagement of the left-hand end of the slide valve with the casing. In this position of piston valve 115, passage 129 and diaphragm chamber 127 will be open to brake pipe 2 through chamber 116 and passage 117 as previously described, and spring 123 will initially be holding the diaphragm 118 in the position in which it is shown in the drawing.

In initially charging brake pipe 2 with fluid under pressure, or upon charging said brake pipe following venting thereof to any pressure less than, for example, ten pounds, fluid under pressure from said brake pipe will flow through passage 22 to chamber 21 and thence through strainer 20 and chamber 19 therein to control chamber 35, whence it will flow through passages 18 and 117 to valve chamber 116 in the cut-off valve device 10, and thence through passage 129 to chamber 127 and to chamber 106 in locking mechanism 100 and through connected passage 107 to chamber 113 and also to a volume reservoir 130. When a sufficient pressure of fluid is thus obtained in piston chamber 106 to overcome the opposing pressure of spring 109 on piston 105 said piston will move downwardly against said spring and move dog 102 on plunger 101 out of locking relation with rod 73 to be followed by unseating of check valve 112 by said plunger.

The emergency high pressure valve device 11 comprises a poppet valve 131 operably mounted in a chamber 132 which is open to a passage and pipe 133 leading to the emergency reservoir 6. This valve 131 controls communication between the chamber 132 and a passage 134 which is constantly open to the passage 162 and may be connected at certain times to a brake cylinder pipe 135; and said valve is urged toward a communication closing position by a spring 136 which is confined by the valve in a cavity 137 formed in the upper end of a stem 138 of a diaphragm follower 139, the inward and outward movement of the valve in the cavity being limited by suitable shoulders formed in the walls of the cavity. The follower 139 is secured by screw-thread means 140 to a diaphragm 141 which takes part in defining a chamber 142 connected to a diaphragm chamber 143 in the vent valve device 12 via passage 144 and is separated from chamber 132 by means of a pair of sealing rings 145 encircling said stem with the space therebetween open to atmosphere by way of a vent port 146.

The brake pipe vent valve device 12 comprises a casing portion having at the opposite side of diaphragm 141 a chamber 147 which is constantly open to brake pipe 2 through a branch of passage 22. Contained in chamber 147 is a vent valve 148 for controlling communication between said chamber and a chamber 149 which is open to atmosphere by way of a passage 150. The valve 148 is connected to one end of a stem 151 extending through chamber 149 and connected at its opposite end to the center of a diaphragm 152 at one side of which is the diaphragm chamber 143, and at the opposite side of which is a chamber 153 open to atmospheric passage 150 through a port 154. A spring 155 compressed in chamber 147 acts on valve 148 for seating it upon dissipation of fluid under pressure from chamber 143 through a control passage 156 formed in the stem 151 and a restricted vent port 157 which is adapted to be in registration with passage 156 during the venting period in addition to a restricted vent port 158 which is adapted to be in registration with passage 156 in normal position of vent valve 148 (as shown in Fig. 1) and also in venting position.

In the well-known AB brake controlling valve device, there are provided separate quick service limiting and emergency inshot valve devices. The limiting valve device is for the purpose of limiting quick service flow of fluid under pressure from the brake pipe to the brake cylinder device, upon initiating an application of brakes, to a chosen pressure in said brake cylinder device whereby a chosen minimum and uniform service application of brakes will be obtained quickly throughout a train. The emergency inshot valve device operates to permit a rapid flow of fluid to a brake cylinder device on a car to a chosen degree required to cause gentle gathering of slack in a long train before applying the brakes with such force as to stop the train during an emergency application of brakes on the train. In the AB valve device, the quick service limiting valve device thus limits pressure in the brake cylinder device to, for example, ten pounds while the emergency inshot valve device limits the initial fast rate of build-up in brake cylinder pressure to a pressure such as twelve to fifteen pounds. It is the applicant's belief that a compromise can be found between these two different pressures of ten and fifteen pounds which could satisfactorily be employed for both quick service and emergency inshot and to this end provides the combined quick service limiting and emergency inshot valve device 13.

The valve device 13 comprises an emergency inshot valve in the form of a check valve 160 contained in a chamber 161 constantly connected to pipe 134 and to the seat of slide valve 27, by way of a passage 162 and arranged to cooperate with a seat 163 for closing a communication of relatively large flow capacity through said seat between said chamber and a passage 164 leading to the brake cylinder pipe 135. A spring 165 urges the check valve 160 toward its seat 163.

A quick service limiting valve 166 and a check valve 167 are mounted in a chamber 168 which valves are adapted to seat in opposite directions, the check valve 167 being adapted to permit flow of fluid under pressure only in the direction from the service slide valve 27 to chamber 168 through a passage 169; and the limiting valve 166 being adapted to open communication from chamber 168 to chamber 161 by way of a fluted pin 170, slidably mounted in a partition wall in the casing, upon movement of valve 166 in a direction for unseating valve 160. A spring 171 interposed between spring seats 172 and 173 bearing on valves 166 and 167, respectively, urges said valves toward their seats. With the fluted pin 170 interposed between and operatively engaging valves 166 and 160, provision is made for normally holding valve 167 seated and valves 160 and 167 unseated by the same action in the same direction by the action of a spring 174 through the medium of a follower and stem 175. The follower stem 175 is slidably mounted in a partition wall of the casing with its upper end, as viewed in Fig. 1, in abutting contact with valve 160 and its lower end secured by screw-thread means 55 to a diaphragm 176, secured at its periphery in said casing and having at one side a spring chamber 177 which is open to atmosphere via a vent port 178 and at the other side a control chamber 179. A sealing ring 180 is provided in a suitable annular groove about stem 175 to prevent leakage of fluid under pressure between passage 164 and chamber 179. Thus, the spring 174 in chamber 177 acts on diaphragm 176 with a certain force such, for example, as twelve pounds to hold the diaphragm in the position for opening valves 160 and 166 when pressure of fluid in passage 134 and chamber 179 is less than a chosen degree, such as ten pounds. When pressure of fluid in chamber 179 is at or in excess of this chosen degree, the diaphragm 176 is adapted to deflect against spring 174 to permit closing of valves 160 and 166 by their respective springs 165 and 171. Check valve 167, however, will unseat only in response to a pressure of fluid in passage 169 sufficient to overcome the opposing force of spring 171.

The strut device 4 is adapted to be carried by a load carrying sprung portion 181 of a vehicle underneath an unsprung portion 182, whereby said device will be spaced away from said unsprung portion a distance which varies according to the degree of load on the vehicle.

The strut device 4 comprises a casing containing a vertically movable piston 183 at the lower side of which is a pressure chamber 184 open by way of a pipe 185 to passage 77 leading to piston chamber 76 in the load compensating valve device 9. Projecting upwardly from the upper side of piston 183 through a non-pressure chamber 186 is a rod 187 terminating outside of the casing below the unsprung portion 182. A spring 188 contained in chamber 184 acts on piston 183 for urging it to the position in which it is shown in the drawing.

When the vehicle is empty the strut device 4 will occupy a position relative to the unsprung portion 182 of the vehicle such as is shown in Fig. 1A and in which upward movement of piston 183 will be so limited by engagement with the unsprung portion 182 as not to open chamber 184 to a pipe 189 which is connected to the passage 86 leading to piston chamber 85 in the load compensating valve device 9. When the vehicle is substantially half-loaded, the strut device 4 will occupy a lower position relative to the unsprung portion 182 of the vehicle so that movement of piston 183 from the position in which it is shown in Fig. 1A will be sufficient to open chamber 184 to pipe 189. When the vehicle is fully loaded, such movement of piston 183 against spring 189 will be permitted as to open chamber 184 to pipe 189 and also to another pipe 190 leading to passage 79 which is connected to chamber 78 in the load compensating valve device 9.

The brake cylinder release and reapplication valve device 14 comprises a brake cylinder vent valve portion 200, a reservoir release valve portion 201 and a brake cylinder reapplication valve portion 202. The brake cylinder vent valve portion 200 comprises a diaphragm 203 secured at its periphery between two sections of the casing, thereby defining in part a control chamber 204 at one side of the diaphragm, which chamber is connected through a passage 205 to a plunger chamber 206 in the release and reapplication valve portion 202. At the other side of the diaphragm 203 is a chamber 207 which is in constant communication with the service application valve device 7 through a passage 208 and communication hereinafter to be described; said chamber 207 being normally open to a valve chamber 209 which is connected to the brake cylinder device 3 through passage 164 and pipe 135. Contained in the valve chamber 209 is a cut-off valve 210 operably mounted on an enlarged portion 211 of a follower and stem 212 which is secured by screw-thread means 213 to the diaphragm 203 for movement thereby into sealing contact with a valve seat 214 formed in the casing to close off communication between chambers 207 and 209. The enlarged portion 211 is adapted to be slidably guided in a suitable bore in a partition wall 215 in a section of casing separating chamber 209 from a vent chamber 216 which is always open to the brake cylinder passage 164. A vent valve 217 is secured by screw-thread means 218 to the outer end of the portion 211 within the chamber 216 for sealing contact with a rib seat 219 surrounding an opening 220 to atmosphere. A spring 221 contained in the chamber 204 exerts a constant force on the follower and stem 212 in a direction for seating the vent valve 217.

The reservoir release valve portion 201 comprises three lift valves 222, 223 and 224 operably mounted in chambers 225, 226 and 227 and urged toward their seated positions by springs 228, 229 and 230, respectively, in which positions they close their respective openings 231, 232 and 233 leading to a chamber 234 which is open to atmosphere by way of an opening 235. The chamber 225 is connected to the auxiliary reservoir 5 through the passage and pipe 24, and chamber 226 is connected to the emergency reservoir 6 through the passage and pipe 133, while chamber 227 is connected to the plunger chamber 206 by way of a passage 236. For selectively unseating the aforesaid valves a tiltable beam 237 is rockably supported in chamber 234 on a fulcrum boss 238 formed in the casing and on one end of a perforate handle member 239 spanning the opening 235. The beam 237 is provided adjacent its left-hand end, as viewed in Fig. 1A, with an upright stem 240 for selectively unseating the valve 222, and a stem 241 for selectively unseating the valve 223; there being a spring 242 disposed between the two stems and interposed between the beam and a portion of the casing so as to urge said beam to rock in a counter-clockwise direction about a point 243 formed on said beam and bearing on the handle 239, and thus to carry said stems away from the valves 222 and 223, respectively. To the right of the point 243 and adjacent the right-hand end of the beam 237, as viewed in Fig. 1A, a pivotal connection is made by means of a fulcrum pin 244 with a perforate plunger 245 for selectively unseating the valve 224. Interposed between the plunger 245 and a portion of the casing is a spring 246 which constantly exerts a downward force on the plunger 245 and thus sometimes on the right-hand end of beam 237, as will now appear. The plunger 245 may be locked in the position in which it is shown in Fig. 1A by a bolt 247 which is arranged for insertion into a suitable opening in said plunger by the action of a diaphragm 248 in response to pressure of fluid supplied from the brake pipe 2 through the passage 18 to a chamber 249 at one side of said diaphragm. A spring 250 is operably mounted at the other side of diaphragm 248 which constantly urges said diaphragm and bolt 247 toward the positions shown, in which positions the plunger is free to be actuated through the manipulation of the handle 239.

With chamber 249 charged with fluid under pressure supplied from the brake pipe 2 as just described and plunger 245 locked by bolt 247, movement of handle 239 out of the position in which it is shown will cause the beam 237 to rock in a clockwise direction about the pin 244, bringing the stem 240 into contact with and unseating the valve 222. Fluid under pressure in auxiliary reservoir 5 will then flow through pipe and passage 24, chamber 225 and opening 231 to chamber 234, and thence to atmosphere by way of opening 235. Further movement of the handle 239 in the same direction will cause the stem 241 to engage and unseat the valve 223, thereby permitting fluid under pressure to flow from emergency reservoir 6 through pipe and passage 133, chamber 226 and opening 232 to chamber 234 and to atmosphere also by way of opening 235.

Should the pressure of fluid in chamber 249 be at atmospheric pressure, spring 250 will be effective in maintaining diaphragm 248 and bolt 247 in the positions shown in Fig. 1A. Initial movement of the handle 239 out of the position shown will cause the beam 237 to rock in a counterclockwise direction about the boss 238 bringing the plunger 245 into contact with the valve 224. Further movement of the handle 239 in the same direction will unseat the valve 224, permitting fluid under pressure to flow from chamber 204 through passage 205, chamber 206, passage 236, chamber 227 and opening 233 to chamber 234 and thence to atmosphere by way of the opening 235. By reason of the restriction in a passage 251 which connects passage 205, open to chamber 204 at one side of diaphragm 203, to passage 164 leading through chamber 209 to chamber 207 at the opposite side of said diaphragm, the reduction in pressure of fluid in chamber 204 will take place at a more rapid rate than that occurring in chamber 207 and will thereby cause the diaphragm to deflect upwardly in response to pressure of fluid in chamber 207 prevailing over the force of spring 221, unseating the vent valve 217 and seating valve 210 which cuts off communication between chambers 209 and 207. With the brake cylinder supply thus cut off and valve 217 unseated, fluid under pressure in chamber 69 of the brake cylinder device 3 will flow to atmosphere through pipe and passage 164, chamber 216 and opening 220. The load compensating chamber 72 of the device 3 will also be vented to atmosphere through a pipe and passage 260, chamber 92 in load compensating valve device 9, past a check valve 259 into passage 164 from which the atmospheric route just described will be followed. Further movement of handle 239 in the same direction as before will cause the upper end of plunger 245 to contact a suitable shoulder 258 formed in the opening 233, after which the beam 237 will rock in a clockwise direction about the pin 244, causing the valves 222 and 223 to unseat serially, as previously described, for venting the auxiliary reservoir 5 and emergency reservoir 6, respectively.

The brake cylinder reapplication valve portion 202 comprises a plunger 252 slidably mounted in a suitable bore in the casing having at one end a button 253 disposed exteriorly of said casing and at the other end a stem 254 extending into chamber 206 for operating a valve 255 controlling communication between a chamber 256 containing said valve and the chamber 206. The chamber 256 contains a spring 257 which constantly urges the valve 255 toward its seated position and this chamber is connected to the service valve device 7 through a passage 308, a choke 307, and passage 162.

When it is desired to make a reapplication of the brakes on the individual car after it has been set out from a train, an operator may press the button 253 inwardly against the force of a spring 310 until the stem 254 contacts the valve 255 and then unseats the valve against the additional pressure of spring 257, whereupon fluid under pressure supplied from the service application valve device 7 to passage 162 for effecting an application of the brakes will flow through choke 307 and passage 308 to chamber 256, past valve 255 to chamber 206, whence it will flow through passage 205 to chamber 204. With the increase in pressure of fluid in chamber 204 to that in chamber 207, which, it will be noted, is connected to chamber 256 also by way of passage 208, spring 221 will be effective in returning the diaphragm 203 and the attached valves 210 and 217 to the positions in which they are shown in Fig. 1A. In these positions fluid under pressure supplied to chamber 207 as just noted above will again flow through chamber 209, passage 164 and pipe 135 to chamber 69 in the brake cylinder device 3. Under certain given conditions fluid under pressure will also flow through the load compensating valve device 9 and pipe 260 to the load compensating chamber 72 in a manner hereinafter more fully described.

It should be noted that by selective operation of the brake cylinder release and reapplication valve device 14, the pressure of fluid in either of the reservoirs or of the brake cylinder device may be reduced to atmosphere regardless of the setting of the retaining valve device 4a.

*Operation.—Initial charging*

Let it be assumed that the brake apparatus is void of fluid under pressure and that the various parts thereof are in the positions in which they are shown in the drawing.

To initially charge the brake apparatus, fluid will be supplied to the brake pipe 2 and be increased in pressure to a degree such as seventy pounds which is the normal operating pressure for freight service.

As fluid under pressure is thus supplied to the brake pipe 2, it will flow therefrom through passage 22 to chamber 21 encircling the air strainer 20, thence through said strainer to chamber 19. From chamber 19 fluid at brake pipe pressure will flow to the emergency diaphragm chamber 35, whence it will flow through the passages 117 and 47, a choke 261 and a passage 263 to the quick action chamber 38. Fluid supplied to passage 117 at brake pipe pressure will flow to diaphragm chamber 116 in the cut-off valve device 10 and also through passage 18 to the service diaphragm chamber 17 and to diaphragm chamber 249 in the brake cylinder release portion 201. Fluid under pressure supplied to brake pipe 2 will also flow via passage 22 to vent valve chamber 147.

As fluid under pressure is supplied from the brake pipe 2 to passage 18 and the service diaphragm chamber 17, a portion of such fluid will flow from said passage through a charging choke 264 to a passage 265 leading to the seat of the main service slide valve 27. With the parts of the service application valve device 7 in their brake release position, in which they are shown in the drawing, a port 266 in the main service slide valve 27 registers at one end with the passage 265 while the other end of said port is open past the upper end of the auxiliary slide valve 33 to valve chamber 23, whereby fluid under pressure supplied from the brake pipe 2 through choke 264 will flow to said chamber and thence by way of passage 24 to the auxiliary reservoir 5 for charging said chamber and reservoir. Fluid under pressure will also flow from valve chamber 23 through a port 286 in the auxiliary slide valve 33, a port 287 in the main slide valve 27 to passage 133, and thence to chamber 132 in the emergency high pressure valve device 11, and also to the emergency reservoir 6.

In the normal or release position of the main service slide valve 27, a cavity 288 therein establishes communication between passage 162 and a passage 390 leading to the retaining valve device 4a, which may be of the type disclosed in Patent No. 2,204,796 issued on June 18, 1940 to C. C. Farmer and operates in the usual way to either permit a direct release of fluid under pressure from the brake cylinder pressure chamber 69, or to limit release of fluid under pressure from said chamber to a chosen degree as well known. Pressure chamber 69 in the brake cylinder device 3 will be vented to atmosphere via the brake cylinder pipe 135, passage 164, through chambers 209 and 207, passage 208 and chamber 256 in valve device 14, and thence through passage 308, choke 307, passage 162, cavity 288, a passage 390, and retaining valve device 4a. Chamber 179 in the quick service limiting and inshot valve device 13 will be vented to atmosphere via a passage 304, a choke 305, passages 134 and 162, cavity 288 in the main slide valve 27, passage 390 and retaining valve device 4a, thereby permitting spring 174 to unseat the check valve 160. Pressure chamber 72 in the brake cylinder device 3 will be vented to atmosphere via the pipe 260, chamber 92 in load compensating valve device 9, past the unseated check valve 259 and thence through passage 164 and communication just described to and retaining valve device 4a.

In the emergency valve device 8, fluid under pressure supplied from the brake pipe 2 to chamber 35 therein will flow through passage 117, choke 261 and a passage 262 to valve chamber 37, and to passage 263 and the quick action chamber 38, to charge same to normal brake pipe pressure. If the vehicle is at the head end of a train where the pressure of fluid in the brake pipe 2 may become increased temporarily to a degree higher than that which it is desired to maintain normally, the valve chamber 37 and quick action chamber 38 will tend to become overcharged, which condition will be prevented by flow of fluid under pressure from said chambers through a passage 270, past a check valve 271 against the pressure of a spring 272 to a chamber 273 and thence through passage and pipe 133 to the emergency reservoir 6 which is of such volume as to absorb such fluid under pressure from chambers 37 and 38 while pressure in the brake pipe temporarily exceeds the normal degree. Thus, when the brake apparatus becomes fully charged, the pressure in chambers 37 and 38 will be substantially the same as brake pipe pressure in chamber 35 acting on the opposite side of the emergency valve diaphragm 34.

At the same time as fluid under pressure is supplied to the auxiliary and emergency reservoirs 5 and 6, respectively, via the service application valve device 7, as above described, fluid under pressure supplied from brake pipe 2 to valve chamber 116 via passage 117 in the cut-off valve device 10 will flow through a passage 274 and past a check valve 275 to passage 133 and the emergency reservoir 6 for accelerating the charging of said reservoir over that provided in the service and emergency application valve devices 7 and 8, respectively, as just described.

At the same time as fluid under pressure is supplied from valve chamber 116 in the cut-off valve device 10 to the emergency reservoir 6, as just described, fluid under pressure from said chamber will also flow through passage 107 in said valve to the volume reservoir 130. Fluid under pressure from valve chamber 116 will also flow through passage 129 to diaphragm chamber 127 in the cut-off valve device 10 and also from passage 129 through passage 107 to piston chamber 106 in the load compensating valve device 9.

When sufficient pressure of fluid, such as twenty pounds, is thus obtained in chamber 106 acting on piston 105, said piston will move downwardly against the pressure of spring 109, thereby carrying the dog 102 out of position for locking relation with rod 73 followed by the operation of the plunger stem 111 to unseat the check valve 112. Upon opening of the check valve 112, the volume of fluid under pressure present in reservoir 130 will suddenly become effective through passage 107, chamber 113, past check valve 112 and through passage 77 in chamber 76 at the right-hand end of the piston 74. Pressure chambers 78 and 85 will be at atmospheric pressure at this time whereby the fluid under pressure supplied to chamber 76 and acting on piston 74 will move said piston toward the left hand until piston 75 contacts a shoulder 276 to assume the position in which it is shown in the drawing, if not already there.

Fluid under pressure thus supplied to passage 77 will flow through pipe 185 to piston chamber 184 in the strut device 4 and will move the piston 183 upwardly against the pressure of the spring 188 until such movement is stopped by contact between the piston rod 187 and the unsprung portion 182 of the vehicle.

If the vehicle is empty this movement of piston 183 will be so limited as not to open pipe 189 to chamber 184 whereby neither piston chamber 78 nor piston chamber 85 in the load compensating valve device 9 will be supplied with fluid under pressure from chamber 184 and the brake control rod 73 will be held in its empty position, corresponding to the empty condition of the vehicle, by pressure of fluid in chamber 76 acting on piston 74.

If the vehicle is carrying a half load, for example, the strut device 4 will be so disposed relative to the unsprung portion 182 of the vehicle that the fluid under pressure provided in chamber 184, as above described, will move the piston 183 past the opening to pipe 189 by the time the piston rod 187 contacts the unsprung portion 182 of the vehicle. Fluid under pressure will then flow from chamber 184 to pipe 189 and thence to piston chamber 85 in the load compensating device 9. When the pressure of fluid thus obtained in chamber 85 an acting on piston 82 becomes increased sufficiently to provide a force which exceeds the opposing force created by pressure of fluid in chamber 76 on the smaller piston 74, the piston 82 will move the pistons 75, 74 and the brake control rod 73 to their partial load positions defined by contact between piston 82 and the partition wall 84.

If the vehicle is fully loaded the strut device 4 will be so disposed with respect to the unsprung portion 182 of the vehicle as to permit piston 183 to be moved by fluid under pressure supplied to chamber 184 past the openings to both pipes 189 and 190, whereupon fluid under pressure will flow from said chamber 184 to pipe 190 and thence to piston chamber 78 in the load compensating valve device 9. When a sufficient pressure of fluid is thus obtained in chamber 78, the piston 75 will move the brake control rod 73 and piston 74 against the pressure of fluid in chamber 76 acting on the latter and smaller piston to the position for a fully loaded vehicle defined by contact between the piston 75 and the casing.

It will thus be seen that during charging of brake pipe 1 the strut device 4 carried by a sprung portion of the vehicle in cooperative relation with the unsprung portion 182 will cause the brake control rod 73 to assume a position corresponding to the loaded condition of the vehicle.

While the brake control rod 73 is being adjusted, as above described, the pressure of fluid in brake pipe 2, in valve chamber 116 and diaphragm chamber 127 to the cut-off valve device 10 will be gradually increasing. This increase in pressure in chamber 127 on diaphragm 124 will cause same to deflect against spring 123 for correspondingly increasing the pressure of said spring against diaphragm 118 to hold the diaphragm 118 against movement in response to the increasing brake pipe pressure in chamber 116. Such deflection of diaphragm 124 will continue until the pressure of fluid in the brake pipe and acting on diaphragm 124 is increased to a chosen degree, such as forty pounds, when it will be stopped by contact of follower 125 with the strut member 122. Further increase in pressure in brake pipe 2 and chamber 116 will then deflect diaphragm 118 against spring 123 until stopped by engagement of follower 126 against strut member 122, such deflection of diaphragm 118 being sufficient to move the slide valve 116 to a cut-off position.

In the cut-off position of piston valve 115, passages 129 and 274 will be cut off from chamber 116 while a peripheral groove 277 in said valve will connect said passages to an atmospheric passage 278. At the same time, passage 77 will be connected to a chamber 279 at the left-hand end of piston valve 115, which is connected to atmosphere through a restricted passage 280, groove 277 and the atmospheric passage 278. As a result, fluid under pressure will be promptly released from diaphragm chamber 127 in the cut-off valve device 10 and from piston chamber 106 in the locking mechanism 100. The venting of piston chamber 106 will permit spring 109 to move the dog 102 on plunger 101 into position for locking engagement with the control rod 73 and hold it in its load adjusted position while the venting of diaphragm chamber 127 will permit spring 123 to move the diaphragm 124 to the position in which it is shown in the drawing for reducing the pressure of said spring to such a degree that diaphragm 118 and piston valve 115 will remain in the cut-off position until brake pipe pressure in chamber 116 is reduced, subsequently, to a relatively low pressure, such as ten pounds. The venting of passage 77 merely dissipates fluid under pressure remaining in piston chamber 76 in the load compensating valve device 9, piston chamber 184 in the strut device 4 and piston chamber 78 or 85 in the valve device 9, in the case of either of the latter chambers being supplied with fluid under pressure by said strut device as above described, it being noted however, that the passage 280 restricts such venting with respect to release of fluid under pressure from piston chamber 106 to insure operation of plunger 101 into locking relation with rod 73 while said rod is yet positively held in the position to which it was adjusted, as above described. Upon venting of fluid under pressure from the strut piston chamber 184 through passage 280 and groove 277 in the cut-off piston valve 115, as above described, spring 188 will return the piston 183 to the position in which it is shown in the drawing out of contact with the unsprung portion 182 of the vehicle.

It will now be seen that in charging the brake pipe 2 with fluid under pressure the brake control rod 73 will be adjusted to either one of three different positions according to whether the vehicle is empty, fully loaded or partially loaded, respectively, and will then be locked by plunger 101 in such adjusted position until the pressure in the brake pipe is subsequently reduced to a relatively low degree.

*Service application of brakes*

If it is now desired to effect a service application of brakes, the pressure in the brake pipe 2 will be gradually reduced at the usual service rate. The choke 264 will restrict back flow of fluid under pressure from the auxiliary reservoir 5 to the brake pipe 2 to such an extent that the brake pipe pressure in diaphragm chamber 17 of the service application valve device 7 will promptly reduce below auxiliary reservoir pressure on the opposite side of diaphragm 16 sufficiently, such as one-half pound, to produce a force on said diaphragm which will shift it and the auxiliary slide valve 33 upwardly relative to the main slide valve 27 in order to lap port 266 and thereby cut off back flow of fluid under pressure from the auxiliary reservoir 5 and valve chamber 23 to the brake pipe 2, and to lap port 287 for disconnecting the auxiliary reservoir 5 from the emergency reservoir 6. When the ports 266 and 287 are thus lapped, plunger 30 in the end of the stem 25 will engage the lower end of the main slide valve 27, which is pressed to its seat by auxilary reservoir pressure in valve chamber 23 and therefore offers a considerable resistance to movement. Upon a slight further reduction in brake pipe pressure relative to that in the auxiliary reservoir, such as another half-pound, a sufficient differential in pressure will be obtained on diaphragm 16 to overcome the opposing force of spring 31 on plunger 30 whereupon the diaphragm 16 will continue deflection upwardly and move the auxiliary slide valve 33 on the main slide valve 27 to an initial quick service position defined by shoulder 29 in the piston stem 25 engaging the lower end of the main slide valve.

In this initial quick service position of the auxiliary slide valve 33 relative to the main slide valve 27, a service port 289 in the latter valve will be opened to valve chamber 23 while a cavity 290 in the auxiliary slide valve will connect a port 291 and a passage 292 from the brake pipe to a port 293 in the main slide valve. The port 293 registers with a passage 294 leading to a quick service reservoir 295 which is constantly open to atmosphere through a vent including a choke 296. With the ports 291 and 293 thus connected, fluid under pressure will flow from the brake pipe to the quick service reservoir 295 at a quick service rate controlled by choke 292a and thence to atmosphere through the choke 296.

The capacity of choke 292a is such as to permit an initial fast local reduction in brake pipe pressure limited to substantial equalization into the quick service reservoir 295, following which brake pipe pressure will continue to reduce at a slower rate controlled by choke 296. This fast initial local but limited reduction in brake pipe pressure is for hastening operation of the brake controlling valve device on the next car of a train. The brake controlling valve device on the next car operates in a similar manner, and in this manner, quick serial response of the brake controlling valve devices in a train to a reduction in brake pipe pressure initiated at the locomotive is obtained.

After this sudden local, quick service reduction in brake pipe pressure has been effected by the flow of fluid under pressure to the quick service reservoir 295, the quick service reduction in brake pipe pressure continues at a slower rate through choke 296 for the purpose of insuring obtaining a sufficient reduction in brake pipe pressure below auxiliary reservoir pressure acting on opposite sides of the local diaphragm 16 to cause said diaphragm to move the main slide valve 27 toward a service position adapted to be defined by engagement with the casing of the end of the portion of stem 25 disposed in chamber 17. As the main slide valve 27 is thus moved, port 291 in the said valve is moved out of registration with the brake pipe passage 292 to terminate quick service venting of fluid under pressure from the brake pipe to the quick service reservoir 295 and at substantially the same time the service port 289 is cracked open to passage 162 to permit fluid under pressure to flow from valve chamber 23 and the auxiliary reservoir 5 to said port and thence through passage 162, past the open valve 160 in the combined quick service limiting and inshot valve device 13 to passage 164 and thence through pipe 135 to pressure chamber 69 in the brake cylinder device 3. Immediately after cracking open passage 162 to the service port 289, a cavity 297 in the main slide valve cracks open the brake pipe passage 292 through the choke 292a to passage 169 and then finally, in service position in which the service port 289 is fully open to passage 162, the brake pipe passage will be open via the choke 292a and cavity 297 to passage 169 whereby at the same time as fluid under pressure is supplied from the auxiliary reservoir 5 to the brake cylinder device 3 via service port 289, a final quick service venting of fluid under pressure from the brake pipe 2 will occur via cavity 297 in the main slide valve to passage 169 and thence past check valve 167 and the open quick service modifying check valve 166 to chamber 161, past inshot valve 160 and through passage 164 and pipe 135 to chamber 69 in the brake cylinder device 3.

It will be noted here that the check valve 167 is provided to prevent back flow to brake pipe 2 of fluid under pressure from the brake cylinder pressure chamber 69 past check valve 166 when the brake pipe is completely vented in effecting an emergency application of brakes, which will hereinafter be described.

It will be noted that as fluid under pressure is supplied via passage 162 to chamber 69 in the brake cylinder device 3 as just described, fluid under pressure supplied from said passage through choke 305 and passage 304 will become effective in chamber 179 at one side of diaphragm 176, the opposite side of which is subject to atmospheric pressure plus the pressure of spring 174 in chamber 177. When a certain pressure, such as ten pounds, has thus been developed in the brake cylinder pressure chamber 69, the pressure of fluid obtaining in chamber 179 of the valve device 13 at that time will overcome the opposing pressure of spring 174 on diaphragm 176 and deflect said diaphragm against said spring to permit closing of the quick service modifying check valve 166 and also of the check valve 160. Seating of the check valve 166 will prevent further quick service venting of fluid under pressure from the brake pipe to said chamber 69, it being noted that such quick service venting will insure a chosen minimum pressure in said chamber and, in the case of a train, in the same chamber on all other cars of the train.

After the quick service modifying valve 166 closes to prevent further local quick service venting of fluid under pressure from the brake pipe 2, fluid under pressure will continue to be supplied from the auxiliary reservoir 5 to the brake cylinder pressure chamber 69 via the service port 289, passage 162, choke 307, passage 308, chamber 256, passage 208, chamber 207, past valve 210 to chamber 209 and thence via passage 164 and pipe 135 until the auxiliary reservoir pressure in the valve chamber 23 is reduced slightly below that in the brake pipe 2 whereupon the diaphragm 16 will deflect toward the lower pressure and move the auxiliary slide valve 33 relative to the main slide valve 27 until the shoulder 28 on stem 25 engages the main slide valve. This engagement will prevent further downward movement of the diaphragm 16 and auxiliary slide valve 33 at this time and defines what is commonly known as a service lap position in which the auxiliary slide valve 33 laps the service port 289 to thereby prevent further flow of fluid under pressure from the auxiliary reservoir to the brake cylinder pressure chamber 69 and thereby limit the pressure of fluid obtained therein in accordance with the reduction in brake pipe pressure.

If a further service reduction in pressure is effected in the brake pipe 2, the diaphragm 16 will move the auxiliary slide valve 33 first to service position and then back to lap position to provide a corresponding increase in pressure in the brake cylinder pressure chamber 69, as will be apparent from the above description, it being noted that with the quick service modifying check valve 166 closed at this time, there will be no quick service venting of fluid under pressure from the brake pipe upon a reduction in brake pipe pressure effected to increase the degree of a brake application.

With the brake control rod 73 positioned, as shown in Fig. 1, for braking an empty vehicle as previously described, some of the fluid under pressure supplied via passage 164 to the brake cylinder pressure chamber 69 by operation of the service application valve device 7 as just described, will flow from said passage 164 to chamber 92 in the load compensating valve device 9, whence it will flow through the passage and pipe 260 to load compensating chamber 72 in the brake cylinder device 3. Thus, for an empty vehicle the braking power for any degree of brake will be limited, with respect to a loaded or partially loaded vehicle by an equal fluid pressure acting on the area of piston 68 surrounding the cylinder 71 in opposition to the brake applying force created by the pressure of fluid in chamber 69 acting on the full area on the opposite side of piston 68.

When the brake control rod 73 is positioned for braking a fully-loaded vehicle, the bosses 103, 104 will be located at the right-hand side of the dog 102, in which position passage 260 will be cut off from passage 164 and connected to atmosphere by way of chamber 92 and vent port 91, thereby venting the load compensating chamber 72 of the brake cylinder device 3 to atmosphere. With load compensating chamber 72 vented to atmosphere, the degree of braking of the loaded vehicle will be governed solely by the pressure of fluid acting in chamber 69 on piston 68.

When the brake control rod 73 is positioned for braking a partially loaded vehicle, the dog 102 will be interposed between bosses 103 and 104, in which position chamber 92 will be cut off from the passage 164 by piston 93, and the passage 260 leading from the load compensating chamber 72 in brake cylinder device 3 is connected to a passage 298, leading to a chamber 299 containing a check valve 300 which is urged toward its seated position by a spring 301. The seated area of check valve 300 is constantly open to brake cylinder passage 164. Upon operation of service application valve device 7 to effect a service application of the brakes, fluid under pressure will flow to brake cylinder pressure chamber 69 through passage 164 and pipe 135. Fluid under pressure supplied to passage 164 will also be supplied to the seated area of check valve 300. Upon an increase in pressure of fluid in passage 164 acting on check valve 300 to a degree sufficient to overcome the opposing pressure of spring 301 fluid under pressure will flow past said check valve and through passage 298 to chamber 92, whence it will flow through passage and pipe 260 to the brake cylinder load compensating chamber 72. The difference in the pressure of fluid in chamber 72 and in 69, and therefore the degree of braking of partially loaded vehicle, will be governed solely by the limiting pressure of the spring 301. This check valve 300 also prevents fluid under pressure being supplied to the chamber 72 until sufficient pressure has developed in chamber 69 to move piston 68 out to its brake applied position, thereby providing a prompter application of the brakes for a partially loaded vehicle than for an empty vehicle, which is believed desirable for control of gathering of slack in a train.

When a service reduction in pressure is effected in brake pipe 2, the pressure in the emergency diaphragm chamber 35 will correspondingly reduce and when thus reduced slightly below that in valve chamber 37 and quick action chamber 38, the diaphragm 34 will deflect in the direction of the lower pressure and move the slide valve 39 to a position in which a port 302 therein registers with an atmospheric passage 303 sufficiently to permit pressure of fluid in valve chamber 37 and quick action chamber 38 to reduce as fast as the brake pipe pressure in chamber 35 is being reduced. Movement of the diaphragm 34 and slide valve 39 will then cease until, after the termination of reduction in pressure in brake pipe 2, the pressure in valve chamber 37 and quick action chamber 38 will have reduced slightly below brake pipe pressure in chamber 35 whereupon said diaphragm will deflect in the direction of the lower pressure and return the slide valve 39 to normal position in which it is shown in the drawing.

*Release of brakes after a service application*

In order to release the brakes on a car after a service application, the pressure of fluid in brake pipe 2 will be restored in the usual manner. When the brake pipe pressure in chamber 17 of the service application valve device 7 is thus increased sufficiently over auxiliary reservoir pressure in chamber 23, the diaphragm will deflect downward and move the slide valves 33, 27 from service lap position to release position in which they are shown in the drawing. With ports 286 and 287 in the auxiliary and main slide valves 33, 27, respectively, now in registration and reopened to the emergency reservoir passage 133 in release position, fluid under pressure from the emergency reservoir 6 will flow to valve chamber 23 and the auxiliary reservoir 5 to promptly restore the pressure therein to substantial equalization of pressures in the two reservoirs, following which, the pressure of fluid in both of said reservoirs will be restored to normal as the brake pipe pressure is restored by supply of fluid under pressure from the brake pipe through choke 264, passages 265, and port 266 in the main slide valve 27.

When the main slide valve 27 is returned to the release position as just mentioned, cavity 288 therein will reconnect passage 162 to the retaining valve device 4a via passage and pipe 390 whereby fluid under pressure will be released from chamber 161 in the combined quick service modifying and emergency inshot valve device 13. Fluid under pressure will also be released from the pressure chamber 69 in the brake cylinder device 3 via pipe 135, passage 164, chamber 209 and the unseated valve 210, chamber 207, passage 208, chamber 256, passage 308, choke 307 and connected passage 162. With the control rod 73 positioned for braking an empty vehicle, as shown in Fig. 1, fluid under pressure in load compensating chamber 72 of the brake cylinder device 3 will be released through passage and pipe 260, chamber 92 in the load compensating valve device 9 and passage 164 until the pressures in chambers 69 and 72 are reduced to substantially atmospheric pressure. With the control rod 73 positioned for braking a partially loaded vehicle, as previously described, fluid under pressure in chamber 72 of brake cylinder device 3 will be vented through pipe and passage 260, chamber 92, a passage 309, past check valve 259, which will be unseated against the pressure of a spring 310 to passage 164, whence it will flow to atmosphere by the route just described for releasing a service application of the brakes.

Upon the release of fluid under pressure from the brake cylinder pressure chamber 69, the return spring 70 will return the piston 68 to its release position to cause release of brakes on the car. Pressure of fluid retained in chamber 72, by reason of the spring 310 acting on valve 259, will be so low as to be dissipated by the return movement of piston 68.

In the valve device 13, the pressure of fluid in chamber 179 will reduce along with brake cylinder pressure through a passage 304 and choke 305 and when sufficiently reduced, spring 174 will return the parts of said valve device to normal position in which they are shown in the drawing.

In releasing the brakes after a service application, fluid at brake pipe pressure will also flow through choke 261 and passage 263 to the emergency valve chamber 37 and quick action chamber 38 to recharge said chambers to normal brake pipe pressure.

In the above description of releasing brakes after a service application, it was assumed that the retaining valve device 4a was turned down to permit complete release of brakes. If the retaining valve device should be turned up to retain a certain pressure in the brake cylinder device, as while cycling down a grade, then upon restoring of brake pipe pressure to recharge the brake apparatus, the pressure of fluid in the brake cylinder chamber 69 of the brake cylinder device will reduce through the retaining valve device 4a and the pressure in the brake cylinder chamber 72 will correspondingly reduce, in the same manner as above described for an empty vehicle, down to the pressure which the retaining valve device is adjusted to hold in pressure chamber 69 whereupon further release of fluid under pressure from chamber 69 and from chamber 72 will cease. In releasing a service application of brakes on a partially loaded vehicle the pressure in chamber 72 will exceed that in chamber 69 by the degree of bias established by spring 310, as previously set forth. The pressure thus retained in the brake cylinder pressure chambers 69 and 72 to hold brakes applied being effective in chamber 179 of the combined quick service modifying and emergency inshot valve device 13 will hold the diaphragm 176 deflected against spring 174 so that the quick service modifying check valve 166 will remain seated. Thus when a subsequent application of brakes is effected with the retaining valve device 4a turned up, quick service action by venting of fluid under pressure from the brake pipe to the quick service reservoir 295 and thence to atmosphere through choke 296 will occur the same as upon initiating an application, as above described, in order to ensure prompt propagation of the reduction in brake pipe pressure through the train and then to insure that the service brake application valve device 7 moves to service position, but with the quick service modifying check valve 166 seated there will be no quick service venting of fluid under pressure from the brake pipe to the brake cylinder pressure chamber 69 as occurred upon the initial reduction in brake pipe pressure.

Emergency application of brakes

If it is desired to effect an emergency application of brakes, a sudden emergency reduction in pressure in brake pipe 2 will be initiated in the usual manner. In response to such reduction in brake pipe pressure, the service application valve device 7 will move to service position for supplying fluid under pressure from the auxiliary reservoir 5 to the brake cylinder pressure chamber 69 the same as is effected by a service application of brakes. Also the service application valve device in its traverse to service position will establish the quick service brake pipe venting communication above described in connection with effecting a service application of brakes, and while some fluid under pressure may be vented from the brake pipe through said communications such venting is immaterial and not necessary due to emergency venting of the brake pipe by operation of the emergency application valve device 8, as will now be described.

Upon an emergency reduction in pressure in brake pipe 2 and hence in diaphragm chamber 35 of the emergency valve device 8, a differential will promptly be established between the pressures of fluid acting on opposite sides of diaphragm 34 which will deflect said diaphragm and move the slide valve 39 upwardly to service position, in which port 302 will register with passage 303 to permit venting of fluid under pressure from the valve chamber 37 and quick action chamber 38, the same as in effecting a service application of brakes. A choke 306 in the port 302 limits such venting to a service rate however so that the emergency rate of reduction in brake pipe pressure in chamber 35 will so exceed the rate of reduction in pressure in valve chamber 37 that a sufficient differential of pressures will be maintained on the diaphragm 34 to continue movement thereof and of the slide valve 39 to an emergency position, defined by engagement with the casing of the portion of screw-thread means 41 disposed in the brake pipe chamber 35, in which position a port near the lower end of slide valve 39 and open to chamber 37 is exposed to the passage 144. Fluid under pressure from valve chamber 37 and quick action chamber 38 will then flow to passage 144 and thence to diaphragm chamber 142 of the emergency high pressure valve device 11 and to diaphragm chamber 143 of the brake pipe vent valve device 12.

The area of diaphragm 152 being greater than the opposing area of valve 148, fluid under pressure thus provided in chamber 143 will promptly deflect diaphragm 152 upwardly to unseat the vent valve 148 whereupon, a sudden emergency venting of fluid under pressure from the brake pipe 2 by way of passage 22, chambers 147, 149 and passage 150 will occur to transmit the emergency reduction in brake pipe pressure to the brake controlling valve device on the next car to the rear in a train and hence serially from car to car throughout the length of the train, in the usual manner.

Upon the reduction in pressure of fluid in chamber 147, fluid under pressure provided in diaphragm chamber 142 of the emergency high pressure valve device 11 will deflect diaphragm 141 downwardly to unseat the check valve 131 whereupon fluid under pressure will flow from the emergency reservoir 6 through passage 133 to passage 134 which at the same time is being supplied with fluid under pressure from the auxiliary reservoir 5 via service application valve device 7.

The fluid under pressure thus supplied to passages 162 and 134 from the auxiliary reservoir 5 and emergency reservoir 6, respectively, will rapidly flow past through passages 134 and 162, past the unseated inshot valve 160 in the combined modifying and inshot valve device 13 to passage 164 and thence to the brake cylinder pressure chamber 69 to initiate an emergency application of brakes until the pressure in chamber 179 of said device is increased to a degree sufficient to deflect diaphragm 176 against spring 174. The emergency inshot valve 160 will then close so that all further supply of fluid under pressure to the brake cylinder pressure chamber 69 up to equalization of the pressures in the auxiliary reservoir 5 and emergency reservoir 6 will flow through choke 307 and passage 308 to the chamber 256, whence it will flow through the passage 208 to chamber 207, then past valve 210 to chamber 209, passage 164 and pipe 135 to brake cylinder chamber 69, it being understood that the load compensating valve device 9 will effect the same connections as hereinbefore described in connection with effecting a service application of brakes to provide fluid in the brake cylinder compensating chamber 72 to limit the degree of brake application according to the load condition of the car.

The initial rapid inshot of fluid under pressure to the brake cylinder pressure chamber 69 past the inshot valve 160, of for example ten pounds, is for the purpose of providing quickly a sufficient application of brakes on cars of a train to cause a gentle gathering of slack between the cars. The capacity of choke 307 is such as to then permit the emergency brake application to increase at such a rate as to maintain the required differential between the braking force applied to the cars at the front and rear of the train to continue the slack gathering to completion, at which time, a full emergency application will have been obtained on cars at the front of the train and will occur serially to the rear of the train to bring the train to a stop in the shortest possible time without damage to the cars and lading.

The fluid under pressure supplied from the emergency valve chamber 37 and quick action chamber 38 to diaphragm chambers 142 and 143 for operating the emergency high pressure valve device 11 and brake pipe vent valve device 12, respectively, is gradually dissipated through passage 156 in the stem 151 and chokes 157, 158 to atmosphere, the capacity of said chokes being such that the check valve 131 will remain open for a sufficient period of time to ensure full equalization of the pressure of fluid in the emergency reservoir 6 into the auxiliary reservoir 5 and brake cylinder pressure chamber 69, while the vent valve 148 will remain open long enough to ensure complete venting of fluid under pressure from the brake pipe 2 and thereby an emergency application of brakes on all cars of the train. At the expiration of this time period, spring 155 will seat the vent valve 148 so that the brake pipe may be recharged whenever desired to cause release of the emergency application of brakes. However, after seating of the vent valve 148, venting of fluid under pressure from the emergency valve chamber 37 and quick action chamber 38 will continue through passage 156 and choke 158 until the pressure in said chamber is reduced to atmospheric pressure to facilitate a release of brakes after an emergency application.

Upon complete venting of fluid under pressure from the brake pipe 2 to effect an emergency application of brakes, the fluid under pressure will be dissipated from valve chamber 116 in the cut-off valve device 10 via passage 117, and spring 123 will expand and return the piston valve 115 to the position in which it is shown in the drawing. This will be immaterial however since all passages opening at the seating face of the piston valve 115 are at atmospheric pressure upon termination of the car load adjustment of control rod 73 during initial charging of the train.

Release of brakes after an emergency application

To effect release of the brakes after an emergency application, fluid under pressure is supplied to the brake pipe 2 and flows to diaphragm chamber 17 in the service application valve device 7 and to diaphragm chamber 35 in the emergency application valve device 8. Fluid in valve chamber 23 of the service application valve device 7 being at reduced auxiliary reservoir pressure at this time, the parts of said device will remain in service position until the opposing brake pipe pressure on diaphragm 16 is increased slightly over the pressure in valve chamber 23.

Fluid under pressure supplied to brake pipe 2 will also flow to chamber 147 in the high pressure valve device 11 and act on diaphragm 141 to move it to the position shown in the drawing, in which position spring 136 will hold valve 131 in its seated position.

As fluid under pressure is thus supplied from the brake pipe 2 to the emergency diaphragm chamber 35, fluid will also flow through choke 261 to the valve chamber 37 and quick action chamber 38 both of which were completely vented in effecting an emergency application of brakes. The flow capacity of choke 261 is so small however with respect to the relatively rapid rate of increase in brake pipe pressure in diaphragm chamber 35 that a sufficient differential of pressures will be promptly obtained on diaphragm 34 to deflect said diaphragm and move the slide valve 39 and stem 40 downward until the stem contacts the plunger 42 and then moves said plunger against spring 44 into contact with the casing, thereby defining a back dump position. During this movement to back dump position, the plunger 51 will be operated to unseat the back dump valve 45 against the bias of spring 49, which may occur at a time when the brake pipe pressure has been increased above atmospheric pressure, only for example about six pounds, and at which time the pressure in the auxiliary reservoir 5 and brake cylinder pressure chamber 69 may be around 65 pounds, said reservoir being still open to said chamber with the parts of the service brake application valve device 7 in service position. As a result, the instant the back dump valve 45 is opened, a rapid flow of fluid under pressure from the auxiliary reservoir 5 and the brake cylinder pressure chamber 69 will occur past said valve and thence past check valve 48 and through passages 47, 262, chambers 35, 19 and 21 to passage 22 and the brake pipe 2. This will cause a rapid local increase in pressure in the brake pipe to substantial equalization of the pressures in the auxiliary reservoir 5 and brake cylinder pressure chamber 69 into the brake pipe at perhaps forty pounds. This back dumping operation will naturally occur first on the first car of a train where the increase in brake pipe pressure is initiated by the engineer's automatic brake valve device on the locomotive, and the rapid local increase in brake pipe pressure thus effected will cause back dump operation of the brake controlling valve device on the next car to the rear in the train and so travel serially from car to car through the train. This back dumping of fluid under pressure to the brake pipe from the brake cylinder pressure chamber 69 saves fluid which would otherwise be merely vented to atmosphere to effect a release of brakes and thereby lost. It also hastens charging of the system and release of brakes after an emergency application and it also reduces the pressure in the auxiliary reservoir 5 to a relatively low degree where the rate of increase in brake pipe pressure subsequent to back dump will be faster than at a higher pressure and facilitate obtaining the necessary differential on the diaphragm 16 of the service brake application valve device 7 to move the parts thereof to their brake release position.

After termination of the back dump operation, the continued supply of fluid under pressure to the brake pipe 2 will continue to increase the pressure of fluid in diaphragm chambers 17, 35. When the pressure in chamber 17 is thus increased sufficiently over the reduced auxiliary reservoir pressure in chamber 33, the diaphragm 16 will return the slide valves 27, 33 to release position in which the auxiliary reservoir 5 will be disconnected from the brake cylinder pressure chamber 69 and said chamber will be vented via passage 390 to effect a release of brakes the same as before described. Also, the emergency reservoir 6 will be opened through passage 133, port 287 in the main slide valve 27 and port 286 in the auxiliary slide valve 33 to valve chamber 23 and thereby to the auxiliary reservoir to permit recharging of said chamber and reservoir with fluid under pressure from the emergency reservoir to equalization of the pressures of fluid therein. After such equalization occurs, final charging of the auxiliary reservoir 5 and emergency reservoir 6 to normal brake pipe pressure will occur from the brake pipe via choke 264 in the same manner as in initial charging.

In the emergency valve device 8, the valve chamber 37 and quick action chamber 38 become gradually charged with fluid under pressure from the brake pipe via choke 261 and when the pressure in said chambers becomes sufficiently increased, spring 44 will return the diaphragm 34, stem 40 and slide valve 39 to their normal positions in which said chambers will finally become charged via choke 261 to the normal pressure in brake pipe 2. Upon return of the diaphragm 34 and connected parts to normal position, the back dump valve 45 will be closed by spring 49 to bottle up at this point the fluid under pressure in the auxiliary reservoir 5.

Also, since the parts of the cut-off valve device 10 assumed the position in which they are shown in the drawing in effecting an emergency application of brakes, charging of the emergency reservoir after the back dump operation above described may be accelerated by flow of fluid under pressure from the brake pipe past the check valve 275, until the parts of said valve device again move to their cut-out position.

While an emergency application of brakes in effect, the locking plunger 101 will hold the control rod 73 in the position corresponding to the load on the car, but upon release of such application, the load compensating valve device 9 under the control of the valve device 10 will again operate the same as before described in connection with initial charging of the brake apparatus, but unless there has been a change in the loaded condition of the car, there will be no change in adjustment of the position of control rod 73. If there has for any reason been a change in the loaded condition of the car, then the control rod 73 will be correspondingly positioned, as will be clear from previous description.

*Summary*

From the foregoing it will be seen that I have provided an improved variable load brake apparatus having control for three stages of load, adjustable only during charging or recharging the brake equipment, in which the proportioning of main brake cylinder pressure and compensating pressure is controlled by a control valve device only in the partially loaded condition of the car. In the load condition the compensating chamber is open to atmosphere and in the empty position the compensating chamber is connected directly to the main brake cylinder pressure chamber. Included in this variable load brake apparatus is a combined quick service limiting valve and emergency inshot valve, both of which are controlled by a single diaphragm responsive to brake cylinder pressure, and also a novel brake cylinder release and reapplication valve device operative to control the supply of fluid under pressure to the brake cylinder device when the brake pipe is at substantially atmospheric pressure, irrespective of the volume or pressure of fluid retained by the retaining valve device. There is also provided a novel combined emergency vent valve and high pressure valve.

Having now described my invention, what I claim as new and desire to secure by Letters Patent is:

1. In a fluid pressure brake apparatus, in combination, a brake pipe, fluid pressure operable brake applying means, brake controlling means operable upon a reduction in brake pipe pressure to supply fluid under pressure to said brake applying means through a single passageway and thence through two parallel arranged communications of different flow capacities and operative upon an increase in brake pipe pressure to vent fluid under pressure from said passageway, a valve device operative in response to an increase in pressure to a chosen degree in said passageway to close communication to the one of said communications of greater flow capacity and in response to a reduction in pressure in said passageway to a lower degree to open such communication, valve means controlling the other of said two communications and operable to either close same and open a vent from said brake applying means or open same and close said vent, said valve means comprising a movable abutment subject on one side to pressure of fluid in a control chamber and on the other side to pressure of fluid in said communication, a valve member having a normal brake applying position in which said vent in closed and said other communication is open and operable by said movable abutment means to a brake releasing position in which said vent is open and said other communication is closed, choke means connecting said brake applying means to said control chamber, one yieldably seated valve means operable manually to vent fluid under pressure from said control chamber to thereby cause said movable abutment to actuate said valve member to its brake releasing position, and other yieldably seated valve means operable manually to connect said other communication to said control chamber to cause said movable abutment to actuate said valve member to its brake applying position.

2. In a fluid pressure brake apparatus, in combination, a brake pipe, fluid pressure operable brake applying means, brake controlling means operable upon a reduction in brake pipe pressure to supply fluid under pressure to said brake applying means through a particular communication, said communication comprising a brake cylinder supply passageway leading from said brake controlling means and a brake cylinder delivery passageway leading to said brake applying means, valve means interposed between said passageways and comprising a movable abutment subject on one side to pressure of fluid in a control chamber and on the other side to pressure of fluid in said supply passageway, a valve member having a normal brake applying position in which said brake cylinder supply passageway is connected to said cylinder delivery passageway and operable by said movable abutment means to a brake releasing position in which said brake delivery passageway is open to atmosphere and said brake cylinder supply passageway is closed, choke means connecting said brake cylinder delivery passageway to said control chamber, one yieldably seated valve means operable manually to vent fluid under pressure from said control chamber to thereby cause said movable abutment to actuate said valve member to its brake releasing position, and another yieldably seated valve means operable manually to connect said supply passageway to said control chamber to cause said movable abutment to actuate said valve means to its brake applying position.

3. In a fluid pressure brake apparatus, in combination, a brake pipe, fluid pressure operable brake applying means, brake controlling means operable upon a reduction in brake pipe pressure to supply fluid under pressure to said brake applying means through a certain passageway, independent brake release means operative, after said brake controlling means has supplied fluid under pressure to said brake applying means, to effect release of fluid under pressure from said brake applying means independently to said brake controlling means, said brake release means comprising a movable abutment subject on one side to pressure of fluid in said passageway, flow restricting means connecting fluid under pressure being supplied to said brake applying means to the other side of said movable abutment, valve means positively connected to said movable abutment having a normal position in which said passageway is open and operable by said movable abutment in response to a reduction in fluid pressure on said other side to a brake release position in which said passageway is closed off and a vent is opened from said brake applying means to atmosphere, resilient means biasing said abutment and said valve means toward said normal position, a brake release valve manually operable to vent fluid under pressure from said other side of said movable abutment for permitting said abutment and thereby said valve means to be actuated to said brake release position by pressure of fluid from said passageway acting on said one side, a manually operable plunger for unseating said release valve, and a bolt operable in response to pressure of fluid in said brake pipe to lock said plunger in an inoperative position.

4. In a fluid pressure brake apparatus, in combination, a brake pipe, an auxiliary reservoir, an emergency reservoir, fluid pressure operable brake applying means, brake controlling means operable to selectively control the supply of fluid under pressure from said reservoirs through a certain passageway to said brake applying means according to the character of brake pipe reduction, independent brake release means operative, after said brake controlling means has supplied fluid under pressure to said brake applying means, to close said passageway and open a vent from said brake applying means, locking means operable upon charging said brake pipe with fluid under pressure to prevent operation of said release means, a first valve means operable to vent fluid under pressure from said auxiliary reservoir, a second valve means operable to vent fluid under pressure from said emergency reservoir, a tiltable lever having one end adapted to actuate said brake release means and the other end adapted to serially actuate said first and then said second valve means and having a fulcrum point adjacent each end, manual means operative to propel said lever at a point intermediate its ends to cause said lever to rock about one or the other of said fulcrum points, and resilient means engaging said lever adjacent said other end for determining that said lever shall first rock about the fulcrum point adjacent said other end to operate said release means and then rock about the fulcrum point adjacent said one end to actuate said first valve means and then said second valve means when said locking means is inoperative and to rock only about the fulcrum point adjacent said one end to effect serial operation of said first and second valve means when said locking means is operative.

5. In a fluid pressure brake apparatus, in combination, a brake pipe, fluid pressure operable brake applying means, brake controlling means operable upon a reduction in brake pipe pressure to supply fluid under pressure to said brake applying means through two parallel arranged communications having different flow capacities and to also establish a quick service venting connection from said brake pipe to the one of said communications having the larger flow capacity, valve means interposed in said connection comprising a pair of oppositely seating valves biased toward their seating positions by an intervening spring, one of said pair normally closing said connection and adapted to permit flow through said connection to said one communication and the other of said pair of valves being normally open to permit flow of fluid under pressure through said connection, a third valve normally open to provide for flow of fluid under pressure supplied from said quick service venting connection and of said fluid supplied from said brake controlling means through said one communication to said brake applying means, means normally opening said other and third valves operative upon a chosen increase in pressure in said brake applying means to effect closing of said other and third valves, release valve means controlling the other of the two communications and selectively operative to either close same and open a vent from said brake applying means or close said vent and open said other communication, and manually controlled means to operate said release valve means.

6. In a fluid pressure brake apparatus, in combination, a brake pipe, fluid pressure operable brake applying means, a first passageway, a quick service passageway, means defining two parallel arranged communications of different flow capacities interposed between said first passageway and said brake applying means, a service application valve device operative upon either a service or an emergency rate of reduction in brake pipe pressure to supply fluid under pressure to said first passageway and also open said brake pipe to said quick service passageway for locally releasing fluid under pressure from the brake pipe, an emergency application valve device operable upon an emergency rate of reduction in brake pipe pressure to supply fluid under pressure to said first passageway, limiting valve means comprising a pair of oppositely seating valves biased toward their seating positions by an intervening spring, one of said pair being adapted to permit flow from said quick service passageway to a chamber and prevent flow in the reverse direction, and the other of said pair of valves being normally open to permit flow from said chamber to the one of said parallel arranged communications of greater flow capacity, a third valve normally opening said one communication, and movable abutment means controlled by resilient means acting in opposition to pressure of fluid supplied to said brake applying means to hold said other valve and said third valve in their normal open positions and responsive to a chosen pressure of fluid in said brake applying means to permit closure of said other and third valves, such that fluid under pressure will thereafter be supplied to said brake applying means solely by way of the other of said communications.

7. In a fluid pressure brake apparatus, in combination, a brake pipe, fluid pressure operable brake applying means, means defining a pair of parallel arranged communications of different flow capacities leading to said brake applying means, a quick service communication through which fluid under pressure may be locally released from said brake pipe to said brake applying means via the one of said parallel arranged communications of greater flow capacity, application valve means responsive to a reduction in brake pipe pressure to open said quick service communication and also supply fluid under pressure to both of said parallel aranged communications, first valve means normally open for permitting flow from said quick service communication to said one communication, second valve means normally open for permitting flow through said one communication, movable abutment means normally biased to a position for maintaining said first and second valve means open and responsive to pressure in said brake applying means in excess of a chosen value to cause closure of said first and second valve means for thereby closing said quick service communication and said one communication, respectively, whereupon fluid under pressure will thereafter be supplied to said brake applying means solely by way of the other of said parallel arranged communications.

8. In a fluid pressure brake apparatus, in combination, a brake pipe, fluid pressure operable brake applying means, brake controlling means operable upon a reduction in brake pipe pressure to supply fluid under pressure to said brake applying means through a single passageway and thence through two parallel arranged communications of different flow capacities, a pressure retaining valve device, a pressure retaining pipe connecting said retaining valve device to said brake controlling means, said brake controlling means being operative upon an increase in brake pipe pressure to open said passageway to said retaining pipe, a valve device operative in response to an increase in pressure in said passageway in excess of a chosen degree to close communication through the one of said two communications of greater flow capacity and in response to a reduction in pressure in said passageway to below said chosen degree to open said one communication, valve means controlling the other of said two communications and operable to a brake release position to close said other communication and open a vent from said brake applying means, manually operable means for effecting the operation of said valve means to brake release position, locking pin means, and movable abutment means responsive to fluid pressure in said brake pipe in excess of a chosen value to carry said locking pin means into mechanical interlocking engagement with said manually operable means to prevent operation of said manually operable means and thereby prevent operation of said valve means to its release position.

9. In a fluid pressure brake apparatus, in combination, a brake pipe, fluid pressure operable brake applying means, brake controlling means operable upon a reduction in brake pipe pressure to supply fluid under pressure to said brake applying means through a certain passageway, independent brake release means operative, after said brake controlling means has supplied fluid under pressure to said brake applying means, to a brake release position to close said passageway and open a vent from said brake applying means, manually operable means for effecting the operation of said valve means to brake release position, a locking pin, and movable abutment means coaxially connected to said locking pin and responsive to charging of said brake pipe with fluid under pressure to shift said locking pin into mechanical interlocking engagement with said manually operable means to prevent operation of said manually operable means to brake release position until fluid under pressure is substantially vented from said brake pipe.

References Cited in the file of this patent
UNITED STATES PATENTS

| | | |
|---|---|---|
| 2,690,932 | Thomas | Oct. 5, 1954 |
| 2,287,775 | Baker | June 30, 1942 |
| 2,293,778 | Sudduth | Aug. 25, 1942 |
| 2,379,329 | Whitney | June 26, 1945 |
| 2,490,998 | Sexton | Dec. 13, 1949 |